United States Patent
Hidinger et al.

(10) Patent No.: US 10,402,237 B2
(45) Date of Patent: Sep. 3, 2019

(54) ENHANCED NOTIFICATIONS

(71) Applicant: Microsoft Technology Licensing, LLC, Redmond, WA (US)

(72) Inventors: Matthew Hidinger, Seattle, WA (US); Ali Rafiee, Woodinville, WA (US); Andrew Clinick, Redmond, WA (US); Lei Xu, Redmond, WA (US); Theron Thomas Fennel, Woodinville, WA (US); Ashwini Varma, Redmond, WA (US); Akhilesh Kaza, Sammamish, WA (US); Nora I Micheva, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/613,250

(22) Filed: Feb. 3, 2015

(65) Prior Publication Data
US 2016/0147581 A1 May 26, 2016

Related U.S. Application Data

(60) Provisional application No. 62/083,139, filed on Nov. 21, 2014.

(51) Int. Cl.
| | | |
|---|---|---|
| *G06F 9/54* | (2006.01) | |
| *G06Q 10/10* | (2012.01) | |
| *G06Q 50/00* | (2012.01) | |
| *H04M 1/725* | (2006.01) | |
| *G06F 3/0481* | (2013.01) | |

(52) U.S. Cl.
CPC ............ *G06F 9/546* (2013.01); *G06F 3/0481* (2013.01); *G06F 3/04817* (2013.01); *G06Q 10/10* (2013.01); *G06Q 50/01* (2013.01); *H04M 1/72519* (2013.01)

(58) Field of Classification Search
CPC .... G06F 9/546; G06F 3/04817; G06F 3/0481; G06Q 10/10; G06Q 50/01; H04M 1/72519
See application file for complete search history.

(56) References Cited

U.S. PATENT DOCUMENTS

| | | | |
|---|---|---|---|
| 6,100,888 A | * | 8/2000 | Gourdol .............. G06F 3/04817 715/837 |
| 6,724,403 B1 | | 4/2004 | Santoro et al. |
| 8,458,613 B2 | | 7/2013 | Oshiro et al. |
| 8,612,851 B2 | | 12/2013 | Kiefer et al. |

(Continued)

OTHER PUBLICATIONS

"Live Tile Templates in Windows Phone 8", Published on: Jan. 1, 2013, Available at: http://developer.nokia.com/community/wiki/Live_Tile_Templates_in_Windows_Phone_8.

(Continued)

*Primary Examiner* — Charles E Anya
(74) *Attorney, Agent, or Firm* — Klarquist Sparkman, LLP

(57) ABSTRACT

A facility for providing enhanced time-sensitive notifications on an electronic device is described. In some such notifications, the facility replaces an icon or name of an application presenting the notification with another image or other text, respectively. In some such notifications, the facility renders certain aspects of the notification on an optional basis, such as based on the capabilities of the electronic device.

19 Claims, 6 Drawing Sheets

(56) References Cited

U.S. PATENT DOCUMENTS

| | | | |
|---|---|---|---|
| 8,612,874 B2 | 12/2013 | Zaman et al. | |
| 2005/0018821 A1* | 1/2005 | Darsin | H04L 12/587 379/88.13 |
| 2006/0225037 A1 | 10/2006 | Glein et al. | |
| 2007/0156494 A1* | 7/2007 | Boss | G06Q 10/109 705/7.19 |
| 2011/0289451 A1* | 11/2011 | Fischer | G06F 9/4443 715/808 |
| 2012/0166954 A1 | 6/2012 | Roth et al. | |
| 2012/0304116 A1* | 11/2012 | Donahue | G06F 3/04817 715/808 |
| 2012/0304117 A1* | 11/2012 | Donahue | G06F 3/04817 715/808 |
| 2012/0311493 A1* | 12/2012 | Sohn | H04M 1/72547 715/808 |
| 2013/0110943 A1 | 5/2013 | Menon et al. | |
| 2013/0219155 A1* | 8/2013 | Barrus | G06F 9/4401 713/1 |
| 2013/0219332 A1* | 8/2013 | Woley | G06F 1/3209 715/808 |
| 2013/0318456 A1* | 11/2013 | Lacey | G06F 3/0481 715/765 |
| 2013/0332883 A1* | 12/2013 | Talukdar | G06Q 10/107 715/810 |
| 2013/0346521 A1* | 12/2013 | Arabo | H04L 29/08693 709/206 |
| 2014/0179377 A1* | 6/2014 | Song | H04W 4/20 455/566 |
| 2014/0280578 A1* | 9/2014 | Barat | G06F 15/17312 709/204 |
| 2014/0325000 A1* | 10/2014 | Lorch | H04M 1/7253 709/206 |
| 2014/0379813 A1* | 12/2014 | Charania | H04L 51/02 709/206 |
| 2015/0056974 A1* | 2/2015 | Kim | H04M 1/72563 455/418 |

OTHER PUBLICATIONS

"Toast notification overview (Windows Runtime Apps)", Published on: Jun. 4, 2012, Available at: http://msdn.microsoft.com/en-us/library/windows/apps/hh779727.aspx.

Lazarevic, Spaso, "Creating Custom Live Tiles for Windows Phone", Published on: Jun. 24, 2013, Available at: http://spasol.wordpress.com/2013/06/24/creating-custom-live-tiles-for-windows-phone/.

"Dynamic News", Published on: Apr. 4, 2014, Available at: http://theme.wordpress.com/themes/dynamic-news/.

"The Tile Template Catalog (Windows Runtime Apps)", Retrieved on: Oct. 29, 2014, Available at: http://msdn.microsoft.com/en-us/library/windows/apps/Hh761491.aspx.

"The Toast Template Catalog (Windows Runtime Apps)", Retrieved on: Oct. 29, 2014, Available at: http://msdn.microsoft.com/en-us/library/windows/apps/Hh761494.aspx.

"Build a live tile", Published on: Nov. 28, 2013, Available at: http://msdn.microsoft.com/en-us/library/ie/dn439794(v=vs.85).aspx.

* cited by examiner

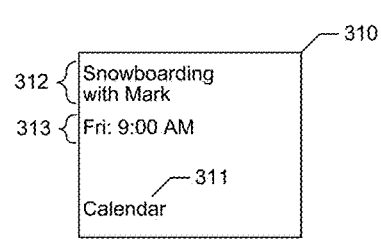
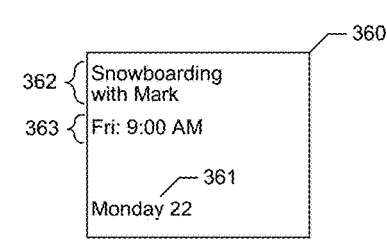
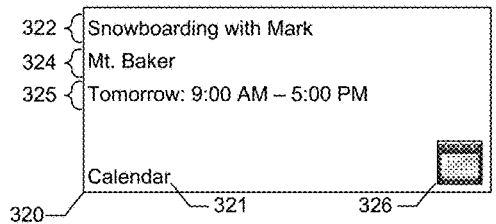
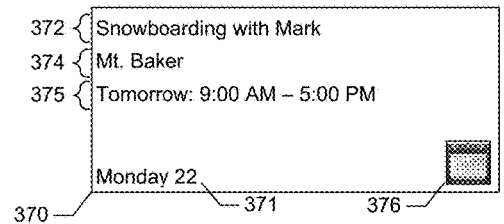
*FIG. 3A*                *FIG. 3B*

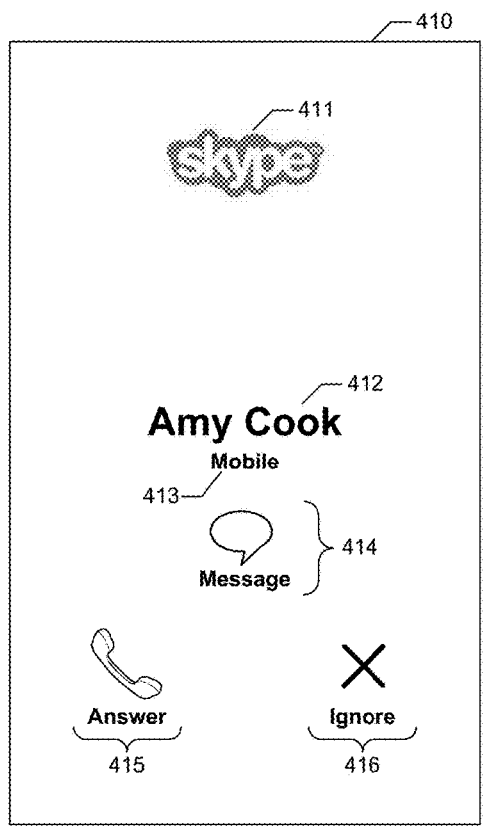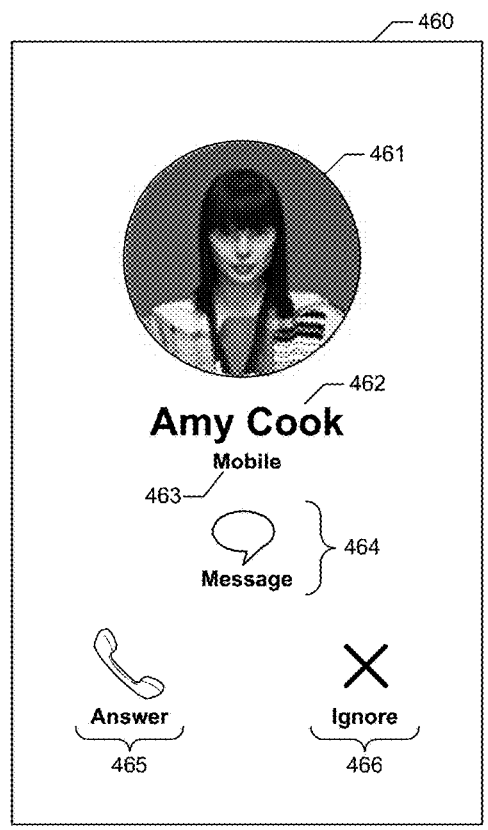
*FIG. 4A*     *FIG. 4B*

ENHANCED NOTIFICATIONS

CROSS REFERENCE TO RELATED APPLICATION

This application claims the benefit of U.S. Provisional Application No. 62/083,139, filed Nov. 21, 2014, and entitled "ENHANCED NOTIFICATIONS," which is incorporated herein in its entirety by reference.

TECHNICAL FIELD

The described technology is directed to the field of visual user interface techniques.

BACKGROUND

The operating systems that control various kinds of electronic devices, such as desktop computers, laptop computers, tablets, wireless phones, and automobile computers, provide various user interface mechanisms for notifying the user of time-specific events. For example, applications developed to execute on the MICROSOFT WINDOWS family of operating systems can perform notifications via user interface constructs, such as toast notifications, live tiles, and badges displayed in connection with live tiles.

In particular, a toast notification is a notification that is pre-emptively rendered irrespective of the user interface state of the operating system, such as in a rectangle that is displayed on top of whatever visual output was being presented at notification time. For example, a toast notification may announce an incoming voice call. A live tile is a visual representation of an application within a start menu, such as in a rectangle, that can be selected by the user to launch the application, and whose contents change in accordance with the status of the application, in some cases using a badge that is displayed on top of or near the tile. For example, a live tile notification by an email application may visually reflect within the application's tile in the start menu a number of unread email messages received when the start menu is displayed.

When an application for the MICROSOFT WINDOWS family of operating systems is developed, logic is included for defining, using the XML markup language, the notifications that the application will deliver via the operating system. These XML notification definitions utilize tags and their attributes specified by an XML schema for notification definitions.

The use of these constructs in their present form is described in more detail, for example, in the following documents, each of which is hereby incorporated by reference in its entirety: Boschin, Andrea, Windows 8.1: Easily send your notifications to tiles, toasts and badges, Silverlight Show, Feb. 4, 2014, available at www.silverlightshow.net/items/Windows-8.1-Easily-send-your-notifications-to-tiles-toasts-and-badges.aspx; Microsoft Dev Center—Windows—Develop—How to—Creating a UI—Working with tiles, badges, and toast—and the subtree it defines, available at http://msdn.microsoft.com/en-us/library/windows/apps/hh761490.aspx; and Microsoft Dev Center—Windows—Develop—How to—User Interface—Tiles, badges and notifications—and the subtree it defines, available at http://msdn.microsoft.com/en-us/library/windows/apps/hh779725.aspx.

BRIEF DESCRIPTION OF THE DRAWINGS

FIGS. 3A and 3B are exemplary display diagrams showing the result of overriding an application name in a notification.

FIGS. 4A and 4B are exemplary display diagrams illustrating the effect of overriding an application icon in a notification.

DETAILED DESCRIPTION

Figure 1:
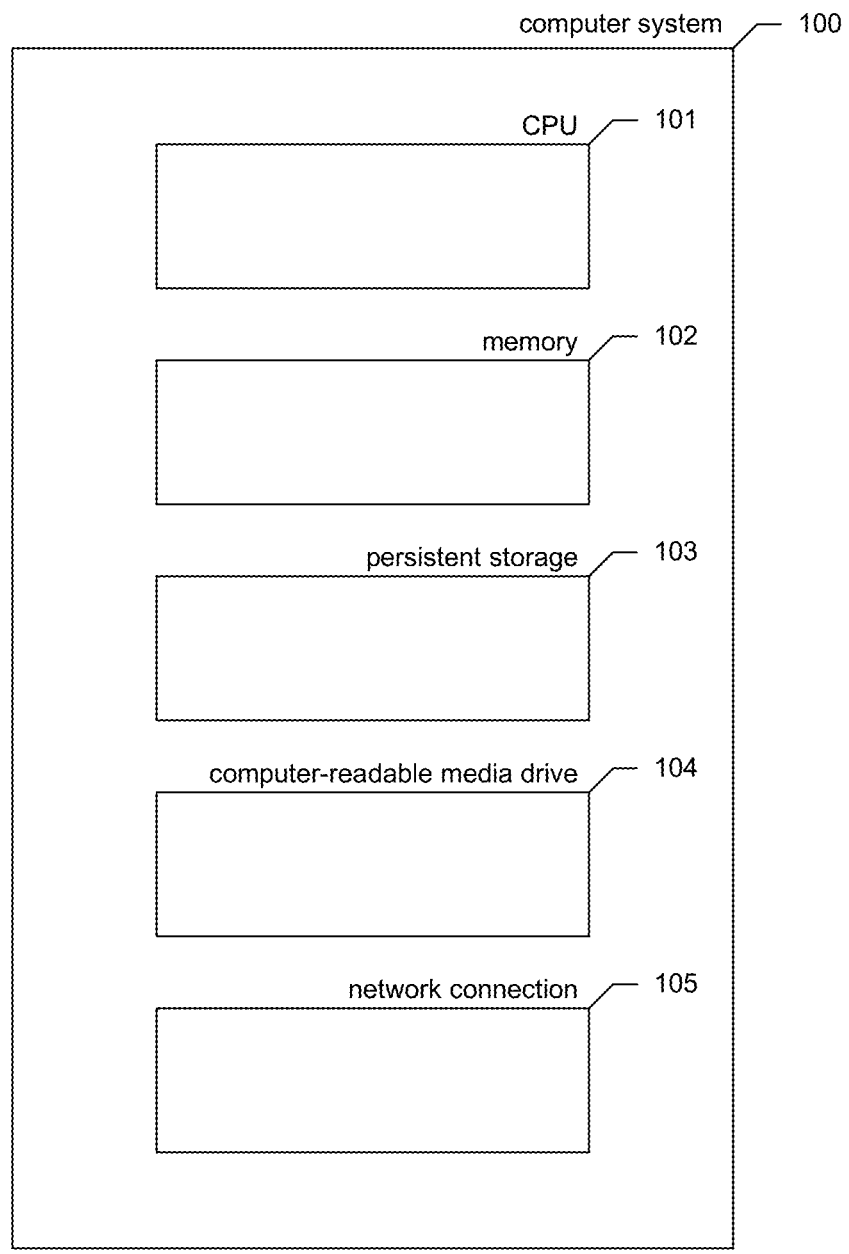
FIG. 1 is a block diagram showing exemplary components that may be incorporated in at least some of the computer systems and other devices on which a facility operates.

The inventors have recognized a number of shortcomings of the conventional notification mechanisms provided by operating systems. The first relates to the design goal of enabling a user to easily associate a notification with the application that produced it. In particular, conventional notification mechanisms tend to literally incorporate in a notification from an application an "official" textual name registered with the operating system for the application, e.g., "Calendar," and an "official" graphical icon registered for the application with the operating system for the application, e.g., a stylized drawing of a datebook. The inventors have recognized that literally copying these registered attributes of an application into the application's notifications is in some cases not the best use of the notification's capacity to inform the user.

The inventors have also recognized that, as device types having different kinds and levels of notification rendering capabilities continue to proliferate, it is not feasible to expect devices of all types to implement all aspects of notification definitions. For example, it may not be feasible for a device having a very small display to implement a style aspect of text included in a notification definition.

In view of these and other shortcomings, the inventors have conceived and reduced to practice a software and/or hardware facility for notification ("the facility") that provides enhanced notifications on electronic devices. The facility operates with respect to various types of notifications, including but not limited to those provided via toasts, tiles, and badges. In some examples, the notifications with respect to which the facility operates are said to be "time-based" or "time sensitive," referring to some relationship that the notifications have to a particular time, such as a present time, a past time, or a future time.

In some examples, the facility provides a mechanism for an application to specify substitution of other text for the application's registered name in a notification presented on behalf of the application. For example, a calendar application may use the facility to specify that a notification presented on behalf of this application contain text identifying the current date in place of the application's name.

In some examples, the facility provides a mechanism for an application to specify substitution of another image for the application's registered icon in a notification presented on behalf of the application. For example, a video telephony application may use the facility to specify that a notification presented on behalf of this application contain an image of a calling person in place of the application's icon.

In some examples, the facility enables an application to specify aspects of a notification that are optional for rendering the notification. These can include, for example, aspects that are common on more traditional devices and difficult or impossible on devices of newer types (e.g., sophisticated text rendering), as well as aspects that are enabled on newer types of devices (e.g., certain audio aspects).

By performing in some or all of these ways, the facility permits applications to present richer and more useful notifications.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, netbooks, mobile phones, personal digital assistants, televisions, cameras, automobile computers, electronic media players, etc. In various examples, the computer systems and devices may include any number of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above may be used to support the operation of the facility, those skilled in the art will appreciate that the facility may be implemented using devices of various types and configurations, and having various components.

Figure 2:
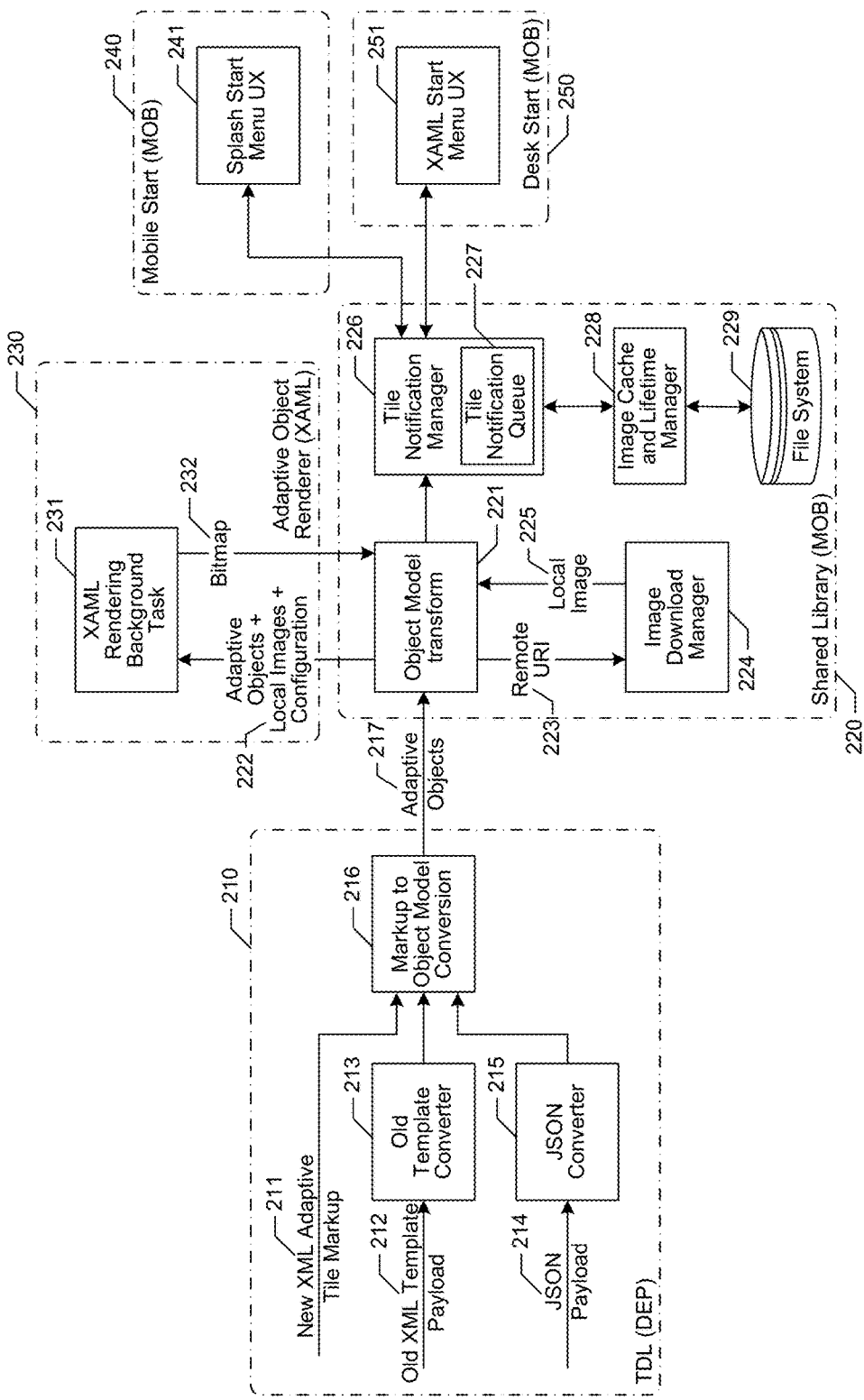
FIG. 2 is a data flow diagram showing an exemplary process by which a facility may render notifications.

FIG. 2 is a data flow diagram showing an exemplary process by which the facility may render notifications. Those of ordinary skill in the art readily will understand that in various other examples the facility may render notifications in a variety of other ways.

In a homogenization stage 210, the facility transforms a notification definition that is received in any of a number of acceptable forms into a common form. Definition 211 is in Extensible Markup Language ("XML") and is in accordance with a current notification definition schema. Definition 212 also is in XML, however; because definition 212 is expressed in accordance with a predecessor notification definition schema, the facility applies an old template converter 213 to transform it into XML that is in accordance with the current schema. Definition 214 is in JavaScript Object Notation ("JSON"), therefore; the facility applies a JSON converter 215 to transform it into XML that is in accordance with the current schema. Once in XML and in accordance with the current schema, the facility performs markup to object model conversion 216 on the notification definition to transform it into an Extensible Application Markup Language ("XAML") object 217.

In a notification management stage 220, the facility manages rendering of the notification from its XAML object, and also manages storage and delivery of the rendered notification. In cases where the XAML object includes a reference to a remote image, the facility submits a remote universal resource identifier 223 of the image to an image download manager. The image download manager uses remoteuniversal resource identifier 223 to retrieve and return the image 225. Once the needed remote images are retrieved, the facility submits the following information to a XAML rendering background task 231: the XAML objects, the retrieved remote images, any needed local images, and relevant configuration information. The XAML rendering background task uses this information to generate one or more bitmaps each constituting a version of the rendered notification.

This rendered notification is added to a tile notification queue 227, which is managed by a Tile Notification Manager 226. The Tile Notification Manager manages the queue, such as by adding new notifications to it, expiring notifications from it, and propagating notifications contained by the display components that will present it. For example, a splash start menu UX component 241 on a mobile device 240 and/or a XAML start menu UX component 251 on a desktop computer 250. For a toast notification (not shown), the rendered notification is propagated to, and/or retrieved by, one or more corresponding components for presenting toast notifications. The facility also propagates the rendered notification to an image cache and lifetime manager 228, which causes the rendered notification to be stored persistently in a file system 229.

In some examples, the facility operates in the response to the use of certain markup tags and attributes in the notification definitions generated by an application. In order to override the use of the registered textual name of the application in a notification presented on behalf of the application, a displayName attribute of the <binding> tag is used. For example, assigning values to this attribute in the <binding> tags, as shown in lines 4 and 10 of the notification definition shown below in Table 1, causes the registered name of a calendar application, "Calendar," to be overwritten with text corresponding to the current date, "Monday 22" for each of two different versions of the notification defined by the notification definition.

TABLE 1

| | |
|---|---|
| 1 | <tile> |
| 2 |   <visual> |
| 3 | |
| 4 |     <binding template="TileMedium" branding="name" displayName="Monday 22"> |
| 5 |       <text hint-wrap="true">Snowboarding with Mark</text> |
| 6 |       <text hint-style="subtle"> Fri 9:00 AM</text> |
| 7 |       </group> |
| 8 |     </binding> |
| 9 | |
| 10 |     <binding template="TileWide" displayName="Monday 22" branding="nameAndLogo"> |
| 11 |       <text> Snowboarding with Mark</text> |
| 12 |       <text hint-style="subtle"> Mt. Baker</text> |
| 13 |       <text hint-style="subtle"> Tomorrow 9:00 AM - 5:00 PM </text> |
| 14 |     </binding> |
| 15 | |
| 16 |   </visual> |
| 17 | </tile> |

FIGS. 3A and 3B are display diagrams showing the result of adding this displayName attribute to the <binding> tags in the notification definition in Table 1. FIG. 3A shows how the notifications are rendered in the absence of the displayName attributes, while FIG. 3B shows the result of rendering the notification once the displayName attribute has been added. Both figures show a smaller version 310/360 and a larger version 320/370 of the rendered notification. It can be seen that, in addition to further information 312 and 313, the smaller rendered version of the notification 310 includes the registered textual name of the application, "Calendar" 311. Similarly, in the larger version, the application's registered name 321 is present in addition to further information 322, 324, 325, and 326.

Turning to FIG. 3B, in which the displayName attribute is added to the <binding> tags as shown in Table 1 above, in the smaller version of the notification 360, the name of the application "Calendar" 311 has been replaced with substitute text "Monday 22" 361 as specified in the value of the displayName attribute. The same substitute string 371 is shown in the larger version of the notification 370. To some users, the notifications shown in FIG. 3B will be more valuable, as they provide additional information about the present date not included in the versions of the notification shown in FIG. 3A.

In some examples, in order to override the display of an application's registered icon as part of a notification presented on behalf of the application, an <image> tag is used in which an "appLogoOverride" value is specified for a placement attribute, and where a value identifying the image with which to override the application's icon is specified for a src attribute. A sample use of this tag occurs in line 4 of the notification definition shown below in Table 2.

TABLE 2

```
1   <toast>
2     <visual>
3       <binding template="ToastGeneric">
4         <image placement="appLogoOverride" src=
          "ms-appx://AmyCook.png" />
5         <text hint-style="header">Amy Cook</text>
6         <text hint-style="body">Mobile</text>
7       </binding>
8     </visual>
9     <actions>
10      <action content="Answer" hint-image="answer.png"
11    activationType="background" arguments="..." />
12      <action content="Message" hint-image="message.png"
13    activationType="foreground" arguments="..." />
14      <action content="Ignore" hint-image="ignore.png"
15    activationType="background" arguments="..." />
16    </actions>
17  </toast>
```

FIGS. 4A and 4B are exemplary display diagrams illustrating the effect of overriding the application icon in a notification. These figures are shown in relation to the notification definition in Table 2. In particular, FIG. 4A shows the notification rendered for the notification definition of Table 2 without the <image> tag in line 4, while FIG. 4B shows the notification rendered from this notification definition with the <image> tag present. In the notification 410 shown in FIG. 4A, it can be seen that, in addition to further information 412, 413, 414, 415, and 416, the notification includes the application's registered icon 411. In contrast, the notification 460 shown in FIG. 4B substitutes an image 461 of the calling user, retrieved using the value of the src attribute of the <image> tag, for the application icon 411 shown in FIG. 4A. The notification shown in FIG. 4B may be more useful for some users as it conveys additional information not present in the notification shown in FIG. 4A: the appearance of the caller.

In some examples, an application specifies optional aspects of a notification in its definition by the use of "hint-*" attributes on certain markup tags used in the notification's definition. Particular such "hint-*" attributes provided by the facility in some examples are as follows. Those skilled in the art will appreciate that, in various other examples, various other combinations of "hint-* attributes may be used. In some examples, the facility provides a variety of mechanisms for extending the set of "hint-*" attributes usable by an application.

TABLE 3

"hint-*" attributes in <text> tag hint styling:

```
1  <text  hint-style = "header | subheader | title | subtitle | base | body |
       caption"
2         hint-wrap = "true | false"
3         hint-maxLines = "[1-10]"
4         hint-minLines = "[1-10]"
5         hint-align="left | center | right" >Hello world!</text>
```

TABLE 4

"hint-weight" attribute in <subgroup> tag that determines its behavior:

```
1   <subgroup hint-weight= "[0-100] " />
```

TABLE 5

"hint-align" attribute in <binding> tag that hints styling:

```
1   <binding hint-valign = " top | center | bottom " ></binding>
```

TABLE 6

"hint-crop" attributes in <image> tag that hints styling:

```
1   <image hint-crop=" none | circle " />
```

An example of a notification definition that uses "hint-*" attributes to specify an optional aspect of a notification is shown below in Table 7. In particular, the hint-align attribute of the <text> tag on line 4 specifies that the text string continued by this <text> tag is optionally to be centered horizontally.

TABLE 7

```
1   <toast>
2     <visual>
3       <binding template="ToastGeneric">
4         <text hint-align="center" >New USB device detected.</text>
5       <visual>
6   <toast>
```

Figure 5A:
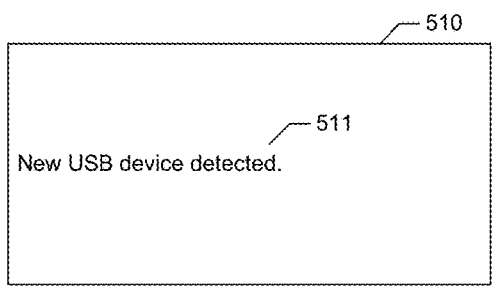
FIGS. 5A and 5B are exemplary display diagrams showing the differential application of optional notification aspects.
Figure 5B:
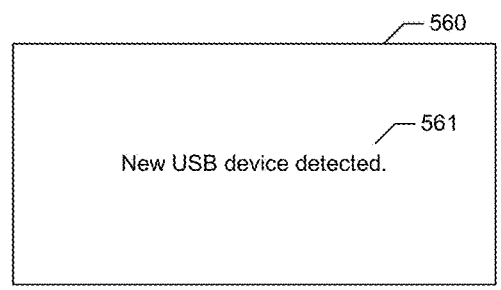

FIGS. 5A and 5B are exemplary display diagrams showing the differential application of optional notification aspects. In particular, FIGS. 5A and 5B correspond to the notification definition above in Table 8. FIG. 5A shows a rendering 510 of the notification in which the optional aspect—center horizontal alignment of the text string—is not given effect, while FIG. 5B shows a rendering 560 of the notification in which this optional aspect is given effect. It can be seen that, in notification 510 shown in FIG. 5A, the text is left-aligned, while in notification 560 shown in FIG.

5B, the text 561 is center-aligned in accordance with the optional hint. Thus, a device capable of performing the specified horizontal alignment would render notification 560, and one that was not capable could and would render notification 510 in which the optional alignment aspect is ignored.

Figure 6:
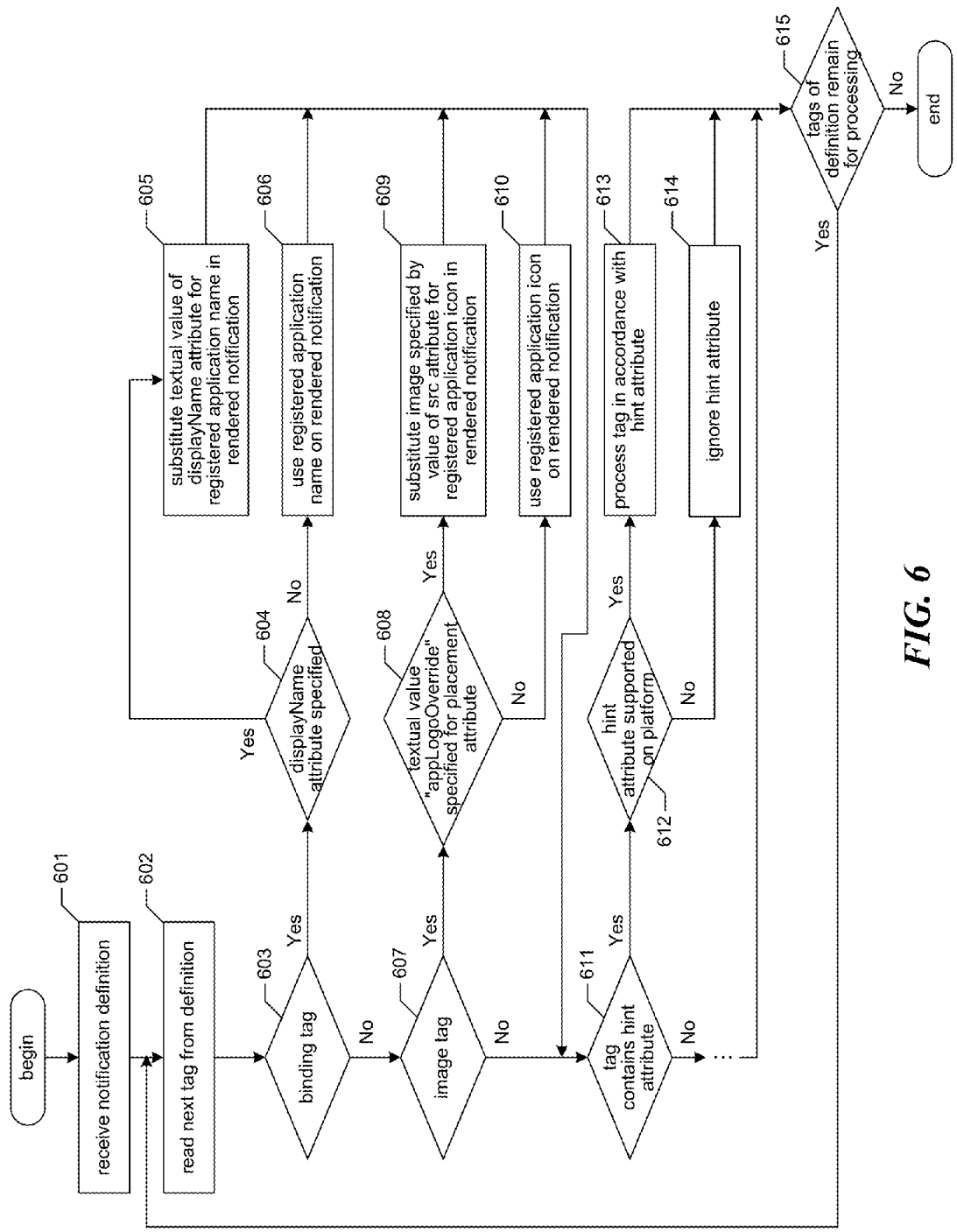
FIG. 6 is a flow diagram showing exemplary steps that may be performed by a facility on a target device in order to render a notification on behalf of an application based upon a notification definition provided by the application.

FIG. 6 is a flow diagram showing exemplary steps that may be performed by the facility on a target device in order to render a notification on behalf of an application based upon a notification definition provided by the application. In step 601, the facility receives the notification definition provided by the application. In step 602, the facility reads the next tag from the definition, beginning with the first tag of the definition. In step 603, if the tag read in step 602 is a binding tag, then the facility continues in step 604, else the facility continues in step 607. (In some examples (not shown), where the first execution of step 603 for the notification definition determines that the tag is not a binding tag, the facility aborts these steps and signals an error.) In step 604, if a value is specified for the displayName attribute in the binding tag as in lines 4 and 10 of Table 1, then the facility continues in step 605, else the facility continues in step 606. In step 605, the facility substitutes the textual value of the displayName attribute on the binding tag for the registered name of the application in the rendered notification as shown, for example, in FIG. 3B. After step 605, these steps continue in step 611. In step 606, where no value was specified for the displayName attribute of the binding tag, the facility uses the name registered for the application in the rendered notification as shown, for example, in FIG. 3A. After step 606, the facility continues in step 611.

In step 607, if the tag read in step 602 is an image tag, then the facility continues in step 608, else the facility continues in step 611. In step 608, if the image tag specifies the value "appLogoOverride" for its placement attribute as in line 4 of Table 2, then the facility continues in step 609, else the facility continues in step 610. In step 609, the facility substitutes an image specified by the value of a src attribute for the application's registered icon in the rendered notification as shown, for example, in FIG. 4B. After step 609, the facility continues in step 611. In step 610, where the value "appLogoOverride" is not specified by the image tag for the placement attribute, the facility uses the icon registered for the application in the rendered notification as shown, for example, in FIG. 4A. After step 610, the facility continues in step 611.

In step 611, if the tag read in step 602 contains a hint attribute, then the facility continues in step 612, else the facility performs conventional processing for the tag (not shown) and continues in step 615. In step 612, if the hint attribute contained by the tag is supported on the target platform, then the facility continues in step 613, else the facility continues in step 614. In step 613, the facility processes the tag in accordance with the hint attribute as shown, for example, in FIG. 5B. After step 613, the facility continues in step 615. In step 614, where the hint attribute is not supported on the target platform, the facility ignores the hint attribute as shown, for example, in FIG. 5A. After step 614, the facility continues in step 615.

Those skilled in the art will appreciate that the steps shown in FIG. 6 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

In step 615, if additional tags of the definition remain for processing, then the facility continues in step 602 to process the next tag, else these steps conclude.

In some examples, a method in a computing system for rendering a notification is performed. The method comprises: accessing a representation of a notification definition submitted by an application program, the application program being installed on the computing system and registered with an operating system installed on the computing system; identifying in the notification definition representation a direction that identifying information specified in the application program's registration with the operating system be overridden in rendering a notification based on the notification definition representation; and, in response to the identifying, rendering a notification based on the notification definition representation in which the selected identifying information is overridden.

In some examples, one or more instances of computer-readable media are provided that collectively store a notification definition data structure. The data structure comprises: time-sensitive information to be rendered on behalf of a program; and a direction to, in rendering the time-sensitive information, override certain information identifying the program, such that, when rendering the time-sensitive information, such rendering can be performed subject to the directed overriding.

In some examples, one or more instances of computer-readable media are provided that collectively have contents configured to cause a computing system to perform a method for rendering a time-sensitive notification. The method comprises: accessing a representation of a notification definition submitted on behalf of an application program; identifying in the notification definition representation, among a plurality of aspects specified for a notification defined by the notification definition representation, an aspect specified to be optional; in response to the identifying, making a determination about whether to give effect to the identified aspect; where it is determined to give effect to the identified aspect, rendering a notification based on the notification definition representation that is in accordance with the identified aspect; and where it is determined to not give effect to the identified aspect, rendering a notification based on the notification definition representation that is not in accordance with the identified aspect.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A method of overriding an application logo in a phone call notification computing system, the method comprising:
    an application program registered with an operating system installed on the computing system, accessing a textual representation of an incoming call notification definition that specifies content to be displayed for an incoming call notification of an incoming call, wherein the incoming call notification definition representation is divided into a visual section comprising a plurality of visual definitions to be displayed for the incoming call notification and an action section comprising a plurality of action definitions for actions that can be taken when the incoming call notification is displayed, the visual definitions specify that an image of an incoming caller replaces the application logo by specifying a tag indicating that the application logo of the application program is to be overridden and a hint comprising text associated with the incoming call notification, and the action definitions specify an image for an action to answer the incoming call;

determining that the incoming call notification definition representation includes an indication that an application logo identifying the application program that is specified in the application program's registration with the operating system is to be overridden in rendering the incoming call notification according to the incoming call notification definition representation and the hint comprising the text associated with the incoming call notification; and in response to determining that the incoming call notification definition representation includes the indication, rendering the incoming call notification according to the incoming call notification definition representation, wherein the application logo identifying the application program replaced with the image of the incoming caller, the text is displayed when a device receiving the incoming call is capable to do so, and the image for an action to answer the incoming call is displayed and activatable to answer the incoming call.

2. The method of claim 1, wherein the rendered notification is a toast notification.

3. The method of claim 1, wherein the rendered notification is a live tile notification.

4. The method of claim 1, wherein the overriding comprises omitting, from the rendered notification, an application icon specified in the application program's registration with the operating system.

5. The method of claim 1, wherein the overriding comprises including in the rendered notification, in place of an application icon specified in the application program's registration with the operating system, an image specified by the notification definition representation.

6. The method of claim 1, wherein the overriding comprises omitting, from the rendered notification, an application name specified in the application program's registration with the operating system.

7. The method of claim 1, wherein the overriding comprises including in the rendered notification, in place of an application name specified in the application program's registration with the operating system, text specified by the notification definition representation.

8. The method of claim 1, wherein the notification definition representation is received from the application program.

9. The method of claim 1, wherein the notification definition representation is expressed in a markup language.

10. The method of claim 1, wherein the notification definition representation was produced by processing the notification definition submitted by the application program.

11. The method of claim 1, wherein the notification definition representation is an intermediate representation of the notification definition submitted by the application program, in a form other than a markup language and in a form other than a rendered notification image.

12. The method of claim 1, wherein:
the notification notifies of an incoming call; and
rendering the notification comprises displaying an image of a caller for the incoming call.

13. The method of claim 1, further comprising:
converting the textual representation from JavaScript Object Notation (JSON).

14. A hardware memory or persistent storage device storing a notification definition data structure overriding an application icon in a phone call notification system, the data structure comprising:
time-sensitive information configured to be rendered on behalf of a program, wherein the time-sensitive information comprises a notification of an incoming call comprising a hint comprising a caller name associated with the notification of the incoming call; and
a direction to, in rendering the time-sensitive information, override the program icon identifying the program, such that the time-sensitive information comprising the notification of the incoming call is renderable in accordance with the directed overriding of the program icon identifying the program;
wherein the notification definition data structure is divided into a visual section comprising a plurality of visual definitions to be displayed for the notification of the incoming call and an action section comprising a plurality of action definitions for actions that can be taken when the notification of the incoming call is displayed, the visual definitions specify that an image of an incoming caller replaces the program icon by specifying a tag indicating that the program icon of the program is to be overridden and the caller name is to be displayed when a device receiving the incoming call is capable to do, and the action definitions specify an image for an action to answer the incoming call.

15. The instances of computer-readable media of claim 14, wherein the direction to override the program icon identifying the program includes a direction to override an icon identifying the program, and wherein the data structure further comprises information specifying an image to be included with the rendered time-sensitive information in place of the icon identifying the program.

16. The instances of computer-readable media of claim 15, wherein the direction to override the icon identifying the program is an "appLogoOverride" value of a placement attribute of an <image> tag.

17. The instances of computer-readable media of claim 14, wherein the direction to override the program icon identifying the program is a direction to override a textual name identifying the program, and wherein the data structure further comprises information specifying text to be included with the rendered time-sensitive information in place of the textual name identifying the program.

18. The instances of computer-readable media of claim 17, wherein the direction to override the textual name identifying the program is a displayName attribute of a <binding> tag.

19. One or more non-transitory computer-readable media collectively storing a notification definition data structure overriding a program icon or a program name in a phone call notification system, the data structure comprising:
time-sensitive information configured to be rendered on behalf of a program;
a direction to, in rendering the time-sensitive information, override the program icon or the program name identifying the program, such that the time-sensitive information is renderable in accordance with the directed overriding of the program icon or program name identifying the program; and
in the time-sensitive information, a hint comprising a place or time associated with the time-sensitive information;

wherein the direction to override the program icon or a program name identifying the program is a direction to override a textual name identifying the program;

wherein the data structure further comprises information specifying text to be included with the rendered time-sensitive information in place of the textual name identifying the program;

the hint comprising the place or time associated with the time-sensitive information is displayed when a width of a tile is capable to do so; and the direction to override the textual name identifying the program is a displayName attribute.

\* \* \* \* \*